UNITED STATES PATENT OFFICE 1,996,638

MANUFACTURE OF OLEFINE OXIDES

Edgar C. Britton, Howard S. Nutting, and Peter S. Petrie, Midland, Mich., assignors to The Dow Chemical Company, Midland, Mich., a corporation of Michigan No Drawing. Application June 27, 1934, Serial No. 732,658

10 Claims. (Cl. 260—156.5)

This invention concerns an improved method of manufacturing olefine oxides from corresponding chlorohydrins, particularly ethylene oxide from ethylene chlorohydrin.

The procedure heretofore considered necessary for the manufacture of an olefine oxide in good yield by heating a chlorohydrin with an alkali is relatively complex, costly, and requires extremely careful control. Due to side reactions, e. g. polymerization, glycol formation, etc., which occur when an olefine oxide is heated with an alkali, it has heretofore been considered essential that the reaction be carried out in such manner as to avoid accumulation of the olefine oxide product in the reaction mixture.

The usual method of carrying out the reaction is to mix gradually the chlorohydrin and alkali reactants at an elevated temperature, e. g. 80°–100° C., while maintaining sufficient vacuum to vaporize and remove the olefine oxide product as fast as it is formed. The vapors are passed upwardly through a reflux condenser maintained at such temperature that the inreacted chlorohydrin and a portion of the steam contained in the vapors are condensed and flow back into the reactor, whereas the olefine oxide vapors remain uncondensed. Successful operation by such method requires accurate control and involves the use of relatively large and costly apparatus.

We have now discovered that, although it is necessary that the olefine oxide product be removed from the hot reaction liquor within a short time, e. g. less than about 10 minutes, after formation, accumulation, and retention of said product in the heated liquor for a short time is not detrimental to the reaction. On the basis of this discovery we have devised a simple method of manufacturing olefine oxides which can be controlled with ease and which can be carried out in relatively small and inexpensive apparatus of simple design. The invention, accordingly, consists in the method of manufacturing olefine oxides hereinafter fully described and particularly pointed out in the claims.

The essential steps of our process consist in heating a mixture of any alkali, e. g. calcium hydroxide, sodium hydroxide, potassium carbonate, etc., and an olefine chlorohydrin to a temperature between 70° and 250° C. under pressure for a period of time sufficient to cause substantial reaction but less than 10 minutes, preferably between 5 seconds and 1 minute, then promptly removing the olefine oxide product from the reacted mixture, preferably by distillation. These operations may, if desired, be carried out in a batch manner using an ordinary bomb or autoclave and a still. However, we prefer to operate in the continuous manner described below.

An aqueous solution or slurry containing an olefine chlorohydrin, e. g. ethylene or propylene chlorohydrin, and an alkali, preferably an alkali metal hydroxide, carbonate, or bicarbonate, is forced under pressure through a tubular autoclave heated to a temperature between about 70° and 250° C., preferably between 90° and 150° C., at such rate that the reacting materials traverse the autoclave in a period not exceeding 10 minutes and preferably between 5 seconds and 1 minute.

The alkali and chlorohydrin reactants may be employed in any desired proportion, but are preferably employed in chemically equivalent quantities. The initial reaction mixture may contain any desired proportion of water, but preferably contains sufficient water to dissolve the alkali reactant. When the alkali and/or chlorohydrin reactants contain only sufficient water to form a more than 3 normal aqueous solution of the alkali after mixing, said reactants are preferably injected separately into the autoclave and mixed within the latter, since otherwise the concentrated compounds may commence to react spontaneously with evolution of olefine oxide vapors when mixed under atmospheric conditions before entering the autoclave. When the alkali and/or chlorohydrin reactants contain more water, e. g. sufficient to form a less than 3 normal aqueous solution of the alkali after mixing, they may first be mixed in the desired proportions under atmospheric conditions and the resultant mixture then be forced through the heated tubular autoclave.

As hereinbefore stated, the reaction mixture is forced through the tubular autoclave at such rate as to be retained therein for a period not exceeding 10 minutes and preferably not exceeding 1 minute. The optimum rate of flow will vary somewhat with changes in the reaction temperature, the proportion of water in the mixture, the kind of alkali employed, etc. In general, as the reaction temperature or concentration of alkali in the mixture is raised, a higher rate of flow through the autoclave is required. Accordingly, if it is found that an excessive portion of the olefine oxide product is being lost through by-product formation, the difficulty may be corrected either by lowering the reaction temperature, diluting the inflowing reaction mixture with water, or by increasing the rate of flow through the reactor.

The reacted liquor may, if desired, be cooled quickly to below 70° C., e. g. to about room temperature, before releasing the pressure, so as to avoid loss of olefine oxide product by side reactions. However, it preferably is discharged through a relief valve into a still wherein the pressure is released and the olefine oxide vaporized and distilled from the mixture, the aqueous liquor which has been stripped of the product being run to waste. Usually the heat contained in the liquor issuing from the autoclave is sufficient to distil the olefine oxide therefrom when the pressure is released, but if necessary, additional heat may be supplied or a vacuum may be applied to aid in the distillation. The vaporized olefine oxide product is dried, e. g. by passage through a body of granulated sodium or potassium hydroxide, and collected in any suitable manner. When an alkali metal hydroxide is employed as the alkali in the reaction, the product is usually obtained directly in substantially pure form. When an alkali metal carbonate or bicarbonate is used, the olefine oxide vapors are intermixed with carbon dioxide. If necessary, the product can be purified by usual procedure, e. g. fractional condensation of the olefine oxide vapors, successive condensation and fractional distillation of the olefine oxide, etc.

The following example illustrates one way in which the principle of our invention has been applied, but is not limiting as to the invention.

*Example*

A solution of 250 grams (3.11 moles) of ethylene chlorohydrin, 125 grams (3.12 moles) of sodium hydroxide, and 2425 grams of water was pumped under pressure through a tubular autoclave of 250 cubic centimeters capacity, which was heated by means of an oil bath maintained at 100° C. The entire solution was pumped through the autoclave in 6 minutes, i. e. at such rate that any portion of the reacting mixture traversed the autoclave in a period of only about 34 seconds. The pressure within the autoclave was approximately 25 pounds per square inch, gauge. The solution flowed from the autoclave through a relief valve into a still maintained at atmospheric pressure. As the pressure on the reacted mixture was released, the ethylene oxide product vaporized and distilled from the mixture. 116 grams (2.64 moles) of pure ethylene oxide were obtained. The yield was 84.8 per cent of theoretical, based on the chlorohydrin employed.

Although the above example illustrates only the preparation of ethylene oxide from ethylene chlorohydrin, other olefine oxides, e. g. propylene oxide, butylene oxides, amylene oxides, phenyl-ethylene oxide, etc., may be manufactured from the corresponding chlorohydrins by similar procedure.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of making an olefine oxide, the steps which consist in subjecting a mixture of an olefine chlorohydrin and an alkali at super-atmospheric pressure to a temperature between about 70° and about 250° C. for a period of time sufficient to cause substantial reaction, but not exceeding 10 minutes, and thereafter removing the olefine oxide product from the reacted mixture.

2. In a method of making an olefine oxide, the steps which consist in heating an olefine chlorohydrin with an alkali under pressure to a temperature between about 70° and about 250° C. for a period of time sufficient to cause substantial reaction but not exceeding 10 minutes and promptly thereafter cooling the reacted mixture to below 70° C.

3. In a method of making an olefine oxide, the steps which consist in heating an olefine chlorohydrin with an alkali under pressure to a temperature between about 90° and about 150° C. for a period of time sufficient to cause substantial reaction but not exceeding 1 minute and promptly thereafter cooling the reacted mixture to below 70° C.

4. In a method of making an olefine oxide, the steps which consist in heating an olefine chlorohydrin with an alkali under pressure to a temperature between about 70° and about 250° C. for a period of time sufficient to cause substantial reaction but not exceeding 1 minute, and promptly thereafter reducing the pressure and distilling the olefine oxide product from the reacted mixture.

5. In a method of making an olefine oxide, the steps which consist in passing an aqueous mixture of an olefine chlorohydrin and an alkali under pressure through a tubular autoclave heated to a temperature between about 70° and about 250° C. at such rate that the reacting mixture traverses the autoclave in less than 10 minutes, and promptly distilling the olefine oxide product from the reacted mixture discharged from the autoclave.

6. In a method of making an olefine oxide, the steps which consist in passing an aqueous solution of an olefine chlorohydrin and an alkali under pressure through a tubular autoclave heated to a temperature between about 90° and about 150° C. at such rate that the reacting mixture traverses the autoclave in a period between about 5 seconds and about 1 minute, reducing the pressure on the reacted mixture as it issues from the autoclave and distilling the olefine oxide product from the mixture.

7. In a method of making ethylene oxide, the steps which consist in heating ethylene chlorohydrin with an alkali under pressure to a temperature between about 70° and about 250° C. for a period of time sufficient to cause substantial reaction but not exceeding 10 minutes, and promptly thereafter removing the ethylene oxide product from the reacted mixture.

8. In a method of making ethylene oxide, the steps which consist in passing an aqueous solution of ethylene chlorohydrin and an alkali under pressure through a tubular autoclave heated to a temperature between about 70° and about 250° C. at such rate that the reacting mixture traverses the autoclave in less than 10 minutes, and promptly distilling ethylene oxide from the reacted mixture discharged from the autoclave.

9. In a method of making ethylene oxide, the steps which consist in passing an aqueous solution containing ethylene chlorohydrin and approximately its chemical equivalent of an alkali under pressure through a tubular autoclave heated to a temperature between about 90° and about 150° C. at such rate that the reacting mixture traverses the heated autoclave in a period between about 5 seconds and about 1 minute, reducing the pressure on the reacted mixture as it issues from the autoclave and distilling the ethylene oxide product from the mixture.

10. In a method of making ethylene oxide, the steps which consist in passing an aqueous solution containing ethylene chlorohydrin and an alkali metal hydroxide in approximately equimolecular proportions under pressure through a tubular autoclave heated to a temperature between about 90° and about 150° C. at such rate that the reacting mixture traverses the heated autoclave in a period between about 5 seconds and 1 minute, reducing the pressure on the reacted mixture as it issues from the autoclave sufficiently to distil ethylene oxide from said mixture.

EDGAR C. BRITTON.
HOWARD S. NUTTING.
PETER S. PETRIE.